(12) United States Patent
Lee et al.

(10) Patent No.: US 7,858,668 B2
(45) Date of Patent: Dec. 28, 2010

(54) ELECTROLYTE MEMBRANE USING POLYBENZOXAZINE BASED COMPOUND AND METHOD OF MANUFACTURING THE SAME

(75) Inventors: Myung-jin Lee, Seoul (KR); Seong-woo Choi, Yongin-si (KR); Hee-young Sun, Yongin-si (KR); Woo-sung Jeon, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1123 days.

(21) Appl. No.: 11/514,831

(22) Filed: Sep. 5, 2006

(65) Prior Publication Data

US 2007/0184323 A1  Aug. 9, 2007

(30) Foreign Application Priority Data

Feb. 7, 2006  (KR) .................... 10-2006-0011831

(51) Int. Cl.
- C08J 5/20 (2006.01)
- C08J 5/22 (2006.01)
- H01M 8/10 (2006.01)

(52) U.S. Cl. .................. 521/27; 429/314; 429/316; 429/317

(58) Field of Classification Search .............. 521/27; 429/33, 314, 316, 317

See application file for complete search history.

(56) References Cited

U.S. PATENT DOCUMENTS 5,525,436 A  6/1996 Savinell et al.

OTHER PUBLICATIONS

Human translation of JP 2004103494, Kimura et al (Apr. 2004), Cited in U.S. Appl. No. 11/743,778.*

U.S. Appl. No. 11/514,254, filed Sep. 1, 2006, Seong-woo Choi et al., Samsung Electronics Co. Ltd.

U.S. Appl. No. 11/743,778, filed May 3, 2007, Seong-woo Choi et al., Samsung Electronics Co. Ltd.

U.S. Appl. No. 11/856,350, filed Sep. 17, 2007, Seong-woo Choi et al., Samsung Electronics Co. Ltd.

U.S. Appl. No. 12/247,338, filed Oct. 8, 2008, Seong-woo Choi et al., Samsung Electronics Co., Ltd.

U.S. Appl. No. 12/208,664, filed Sep. 11, 2008, Seong-woo Choi et al., Samsung Electronics Co., Ltd.

U.S. Appl. No. 12/263,011, filed Oct. 31, 2008, Seong-woo Choi et al., Samsung Electronics Co., Ltd.

(Continued)

*Primary Examiner*—Duc Truong
(74) *Attorney, Agent, or Firm*—Lee & Morse, P.C.

(57) ABSTRACT

An electrolyte membrane includes a cross-linked reaction product of a benzoxazine monomer and a cross-linkable compound. The electrolyte membrane is impregnated with 300 to 600 parts by weight of phosphoric acid based on 100 parts by weight of the electrolyte membrane, and has a yield strain 0.5% or less, and a yield stress 0.3 Mpa or less. The cross-linked material has a strong acid trapping ability with respect to the benzoxazine compound and excellent mechanical properties due to a cross-linkage. Also, the solubility of the cross-linked material in polyphosphoric acid is low, thereby showing excellent chemical stability. Accordingly, when the cross-linked material is used, an electrolyte membrane having an excellent liquid supplementing ability and excellent mechanical and chemical stability at a high temperature can be obtained. The cross-linked material can be obtained by a simple polymerization process by combining a benzoxazine monomer and a crosslinkable compound and by using heat instead of using a polymerization initiator or a cross-linking agent.

16 Claims, 11 Drawing Sheets

OTHER PUBLICATIONS

U.S. Appl. No. 12/262,854, filed Oct 31, 2008, Seong-woo Choi et al., Samsung Electronics Co., Ltd.
U.S. Appl. No. 11/947,011, filed Nov. 29, 2007, Seong-woo Choi et al., Samsung Electronics Co., Ltd.
U.S. Appl. No. 12/266,039, filed Nov. 6, 2008, Seong-woo Choi et al., Samsung Electronics Co., Ltd.
U.S. Appl. No. 12/208,492, filed Sep. 11, 2008, Seong-woo Choi et al., Samsung Electronics Co., Ltd.
U.S. Appl. No. 11/765,033, filed Jun. 19. 2007, Hee-young Sun et al., Samsung Electronics Co., Ltd.
U.S. Appl. No. 11/765,056, filed Jun. 19, 2007, Kyung-jung Kwon et al., Samsung Electronics Co., Ltd.

* cited by examiner

ELECTROLYTE MEMBRANE USING POLYBENZOXAZINE BASED COMPOUND AND METHOD OF MANUFACTURING THE SAME

CROSS-REFERENCE TO RELATED APPLICATIONS

This application claims the benefit of Korean Patent Application No. 2006-11831, filed on Feb. 7, 2006, in the Korean Intellectual Property Office, the disclosure of which is incorporated herein in its entirety by reference.

BACKGROUND OF THE INVENTION

1. Field of the Invention

Aspects of the present invention relate to an electrolyte membrane using a polybenzoxazine compound and a method of manufacturing the same, and more particularly, to an electrolyte membrane of a fuel cell for high temperature and low humidity conditions, and a method of manufacturing the same.

2. Description of the Related Art

In conventional ionic conductors, ions are moved by applying a voltage. Ionic conductors are widely used in electrochemical devices, such as fuel cells, electrochemical sensors, and the like.

For example, in terms of energy generating efficiency, system efficiency, and component durability, fuel cells require a proton conductor that exhibits long-term stable proton conductivity at an operating temperature of 100 to 300° C. under non-humidified conditions or low-humidified conditions such as a relative humidity of less than 50%.

The above requirements have been considered in the development of conventional solid polymer-type fuel cells. However, solid polymer-type fuel cells that include a perfluorocarbonsulfonic acid membrane as an electrolyte membrane generates insufficient energy at an operating temperature of 100 to 300° C. in a relative humidity of 50% or less.

Conventional fuel cells include fuel cells using an electrolyte membrane containing a proton conducting agent, fuel cells using a silica diffusion membrane, fuel cells using an inorganic-organic composite membrane, fuel cells using a phosphoric acid-doped graft membrane, and fuel cells using an ionic liquid composite membrane.

In addition, a solid polymer electrolyte membrane formed of polybenzimidazole (PBI) in which a strong acid, such as a phosphoric acid or the like, is doped is disclosed (in U.S. Pat. No. 5,525,436). In such an electrolyte membrane, ionic conductivity is increased by phosphoric acid doping, but the phosphoric acid doping causes the mechanical properties of the electrolyte membrane to deteriorate. In particular, PBI doped with a strong acid such as a phosphoric acid lacks mechanical strength and chemical stability at high temperatures, and the liquid supplementing capability of the phosphoric acid decreases.

SUMMARY OF THE INVENTION

Aspects of the present invention provide an electrolyte membrane using a polybenzoxazine compound having an acid trapping capability, mechanical and chemical stability, and a liquid supplementing ability for phosphoric acid at high temperatures, and a method of manufacturing the same.

According to an aspect of the present invention, there is provided a method of manufacturing an electrolyte membrane formed of a cross-linked reaction product of a benzoxazine monomer with cross-linkable compound, the method including: (a) dissolving the cross-linkable compound in a solvent to obtain a 10 to 20% by weight cross-linkable compound solution; (b) mixing the cross-linkable compound solution and the benzoxazine monomer to obtain a mixture of the benzoxazine monomer and the cross-linkable compound; (c) forming a membrane using the mixture; (d) heating the membrane to perform thermal curing to a temperature of 80 to 250° C.; and (e) impregnating the resultant obtained through the thermal curing with an acid to form an electrolyte membrane.

The membrane may be formed by tape casting the mixture of the benzoxazine monomer and the cross-linkable compound or by casting the mixture on a supporter.

If the membrane is formed by casting the mixture on a supporter, the method may further include removing the supporter after thermal curing by exfoliating the thermally cured membrane from the supporter.

The thermally cured membrane may be removed from the supporter by immersing the thermally cured membrane in distilled water at a temperature of 60 to 80° C.

According to another aspect of the present invention, there is provided an electrolyte membrane including a cross-linked reaction product of a benzoxazine monomer with a cross-linkable compound. The membrane may be impregnated with 300 to 600 parts by weight of phosphoric acid based on 100 parts by weight of the electrolyte membrane, and have a yield strain of 0.5% or less and a yield stress of 0.3 Mpa or less.

According to another aspect of the present invention, there is provided an cross-linked material that is a reaction product of a benzoxazine monomer and a cross-linkable compound, wherein the cross-linked material is formed under conditions wherein the benzoxazine monomer polymerizes to form a polybenzoxazine that cross-links with the cross-linkable compound.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
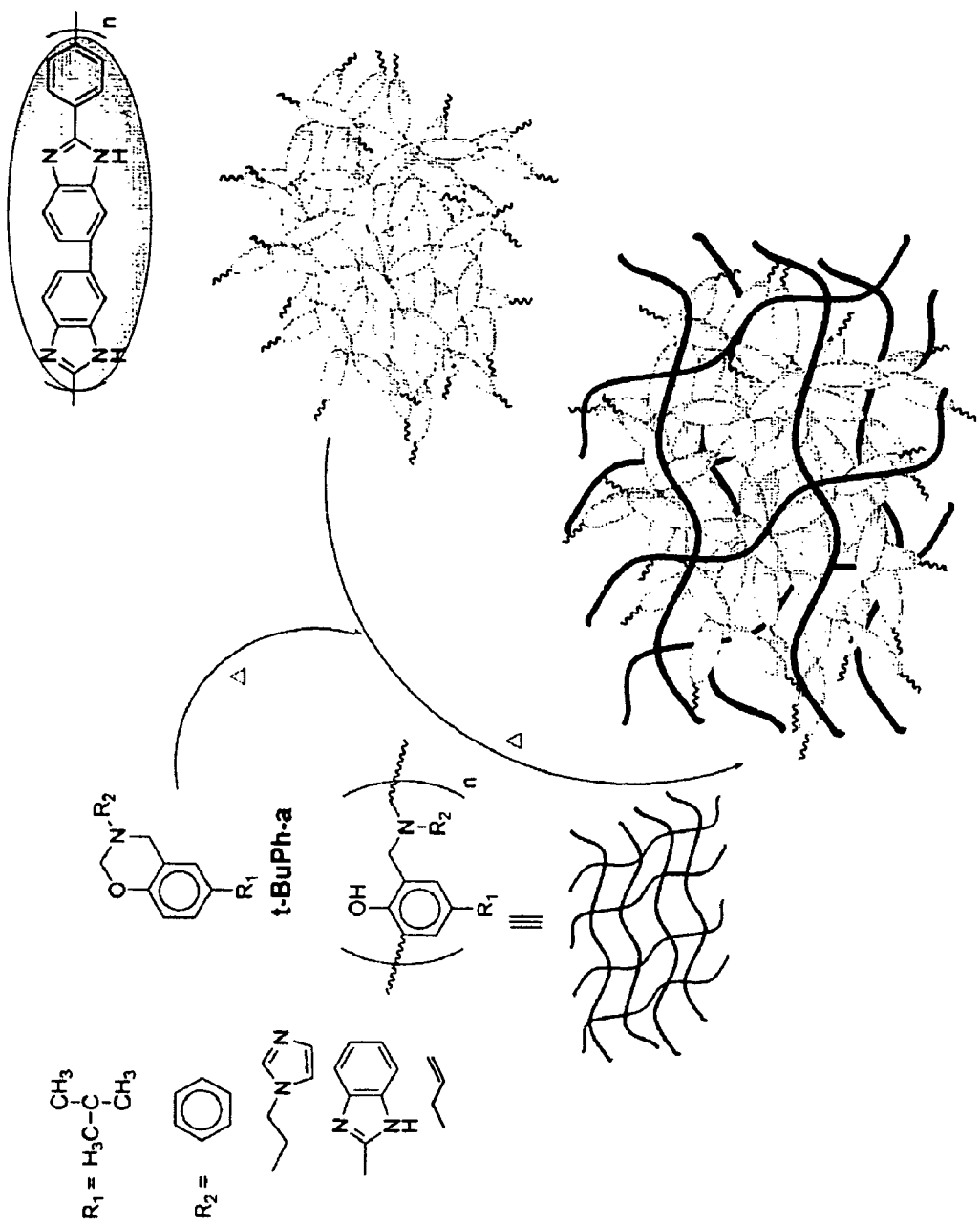
FIGS. 1 and 3 are diagrams illustrating thermal curing reaction between a benzoxazine monomer and polybenzimidazole according to an embodiment of the present invention.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

A method of manufacturing an electrolyte membrane formed of a cross-linked reaction product of a a benzoxazine monomer and a cross-linkable compound according to an embodiment of the present invention will now be described.

First, the cross-linkable compound is dissolved in a solvent to obtain a cross-linkable compound solution. Then, the benzoxazine monomer is added to the cross-linkable compound solution, and the resultant mixture is mixed.

The concentration of the cross-linkable compound solution may be 10 to 20% by weight based on the total weight of the resultant mixture. When the concentration of the cross-linkable compound is less than 10% by weight, the viscosity of a casting solution is low, and thus the thickness of the electrolyte membrane can not be appropriately adjusted. When the concentration of the cross-linkable compound is above 20% by weight, complete dissolution of the cross-linkable compound may not occur.

Then, an aging process is performed on the resultant mixture. The aging process may be performed at 60 to 80° C. for at least 4 hours, for example, 4 to 12 hours. When the temperature of the aging process is below 60° C., sufficient mixing does not occur, resulting in the formation of a non-uniform membrane during casting. When the temperature of the aging process is above 80° C., the composition of the solution changes since the temperature is higher than the boiling temperature of the resultant mixture.

Examples of the solvents used when preparing the benzoxazine monomer solution and the cross-linkable compound solution include dimethylacetamide, N-methylpyrolidone and the like, and the amount of the solvent is 400 to 900 parts by weight based on 100 parts by weight of the cross-linkable compound.

A membrane is formed using the mixture obtained according to the above process. A method of forming the membrane may be a tape casting method or a conventional coating method. Examples of the coating method include a method of casting the mixture using a doctor blade on a supporter. For example, the doctor blade may have a gap of 250 to 500 μm.

The membrane obtained according to the above process is heated to a temperature of 80 to 250° C. to perform thermal curing. When the temperature of the thermal curing is below 80° C., a curing reaction cannot progress, and when the temperature of the thermal curing is above 250° C., side-products are produced.

In order to control the temperature for the thermal curing, a convection oven for high temperatures in which a circulating fan is equipped may be used.

Then, an electrolyte membrane is formed by impregnating the result with an acid.

The acid may be, but is not limited to, a phosphoric acid or the like, and the amount of the acid may be 300 to 1000 parts by weight based on 100 parts by weight of the electrolyte membrane.

The concentration of the acid is not limited, and the phosphoric acid may be an 85% by weight aqueous phosphoric acid solution. The phosphoric acid may be impregnated into the result for 2.5 to 14 hours at 80° C.

In the process of forming the electrolyte membrane, when a casting method using a doctor blade is used, a process of separating the electrolyte membrane from the supporter to remove the supporter may be further performed prior to impregnating the acid after the thermal curing process. In this case, the electrolyte membrane with the supporter is first immersed in distilled water with a temperature of 60 to 80° C. to remove the supporter.

The supporter can be formed of any material that supports an electrolyte membrane, for example, a glass substrate, a polyimide film, or the like.

When a tape casting method is used, since the tape casting membrane is separated from a supporter such as polyethyleneterephthalate film prior to curing and then is put in an oven for the thermal curing, a process of removing the supporter is unnecessary.

Moreover, when the electrolyte membrane is formed using the tape casting method in which a mixture of benzoxazine monomer and a cross-linkable compound such as polybenzimidazole is used, a process of filtering the resultant mixture can be further performed.

Figure 6:
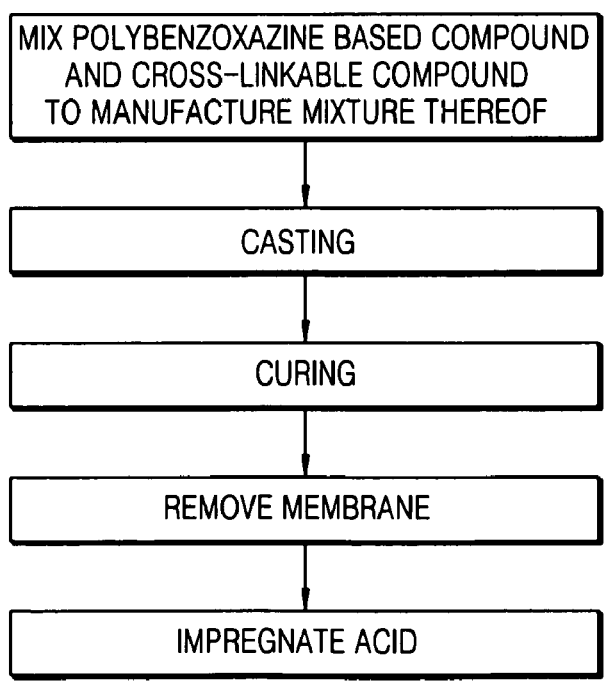

When an electrolyte membrane is formed by the method according to an embodiment of the present invention illustrated in FIG. 6, an oven equipped with a circulating fan may be used to maintain an excellent mixing property of the mixture of the benzoxazine monomer and the cross-linkable compound.

Figure 5:
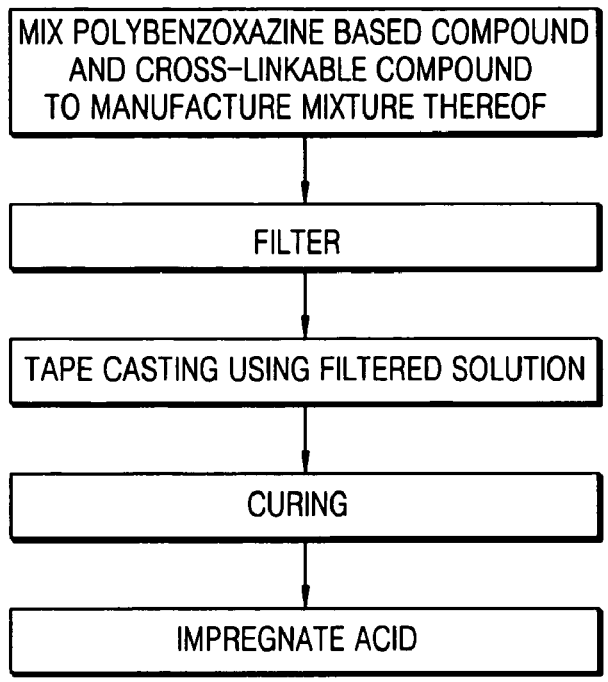
FIGS. 5 and 6 are flowcharts illustrating methods of manufacturing an electrolyte membrane according to embodiments of the present invention.

The method of forming an electrolyte membrane according to an embodiment of the present invention illustrated in FIG. 5 or 6 is simple and allows mass production.

As used herein, the term "benzoxazine monomer" refers to a monomer having at least one substituted or unsubstituted benzoxazine group. In particular, the term "benzoxazine monomer" includes mono-functional, di-functional and tri-functional benzoxazine compounds as described herein. Moreover, even where the term "a benzoxazine monomer" is used, it is to be understood that one or more benzoxazine monomers as described herein may be used together. In particular, the benzoxazine monomer used in an embodiment of the present invention can be a benzoxazine monomer represented by Formula 1 or a benzoxazine monomer represented by Formula 2.

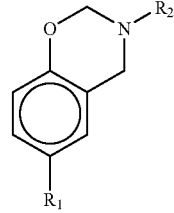

[Formula 1]

where $R_1$ is hydrogen, a substituted or unsubstituted C1-C20 alkyl group, a substituted or unsubstituted C6-C20 aryl group, a substituted or unsubstituted C2-C20 heteroaryl group, a substituted or unsubstituted C4-C20 cycloalkyl group, or a substituted or unsubstituted C2-C20 heterocyclic group; and $R_2$ is a substituted or unsubstituted C1-C20 alkyl group, a substituted or unsubstituted C2-C20 alkenyl group, a substituted or unsubstituted C1-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic group alkyl group, a substituted or unsubstituted C2-C20 heterocyclic group, or a substituted or unsubstituted C2-C20 heterocyclic alkyl group.

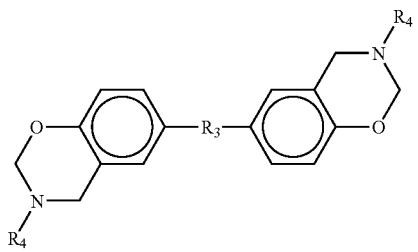

[Formula 2]

where $R_3$ is a substituted or unsubstituted C1-C20 alkylene group, a substituted or unsubstituted C6-C20 arylene group, a substituted or unsubstituted C2-C20 heteroarylene group, —C(=O)—, or —SO$_2$—; and $R_4$ is a substituted or unsubstituted C1-C20 alkyl group, a substituted or unsubstituted C2-C20 alkenyl group, a substituted or unsubstituted C1-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group.

As specific, non-limiting examples, $R_1$ in Formula 1 may be a tertiary butyl group and $R_2$ may be a phenyl group, —CH$_2$—CH=CH$_2$, or a group represented by one of the Formulae illustrated below.

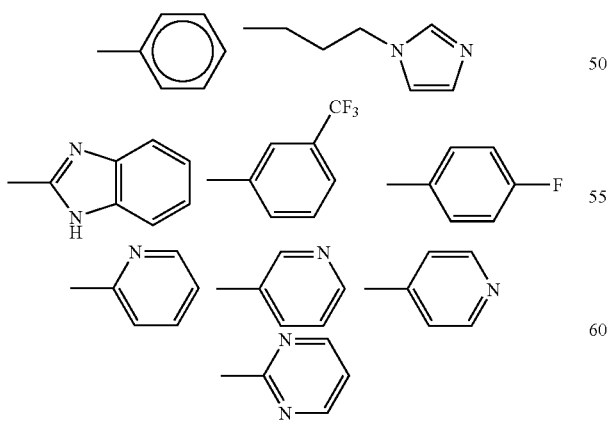

Examples of benzoxazine monomer represented by Formula 1 are compounds represented by Formulas 3 through 12.

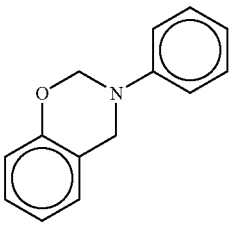

[Formula 3]

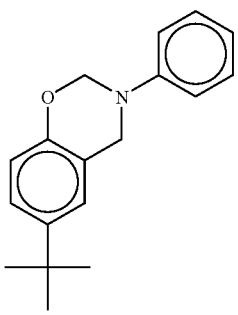

[Formula 4]

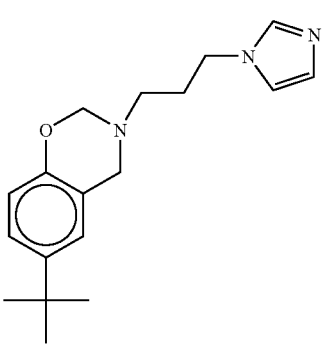

[Formula 5]

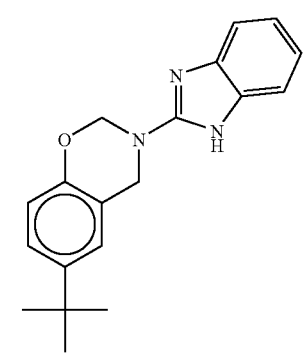

[Formula 6]

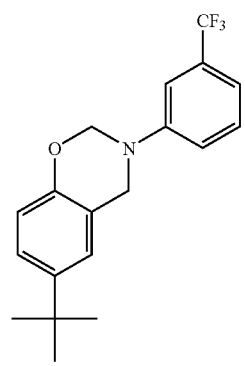

[Formula 7]

[Formula 8]

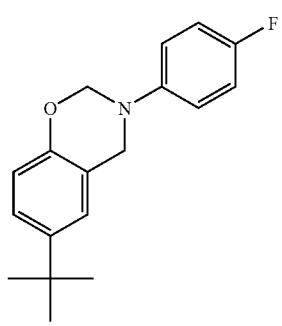

[Formula 9]

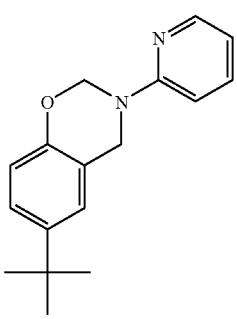

[Formula 10]

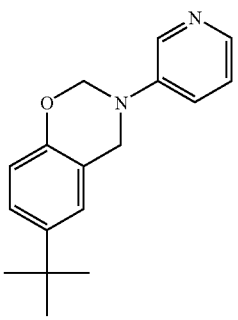

[Formula 11]

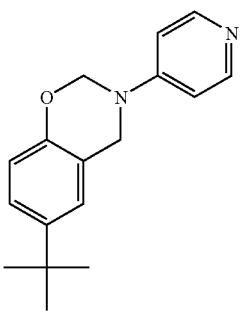

[Formula 12]

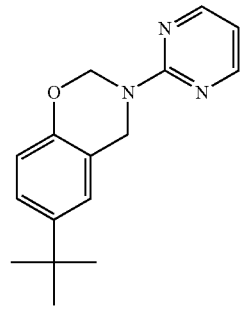

In Formula 2, where $R_3$ is —C(CH$_3$)$_2$—, —C(CF$_3$)$_2$—, —C(=O)—, —SO$_2$—, —CH$_2$—, —C(CCl$_3$)—, —CH(CH$_3$)—, or —CH(CF$_3$)—, the compound of Formula 2 is a difunctional benzoxazine compound having 2 benzoxazine rings. When $R_3$ is a group represented by the Formula below, the compound of Formula 3 is a trifunctional benzoxazine compound having 3 benzoxazine rings.

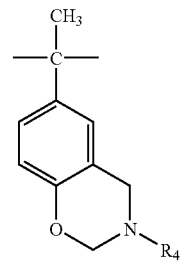

Examples of the benzoxazine monomer represented by Formula 2 can be compounds represented by Formulas 13 through 17.

[Formula 13]

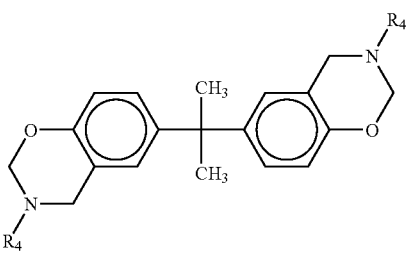

[Formula 14]

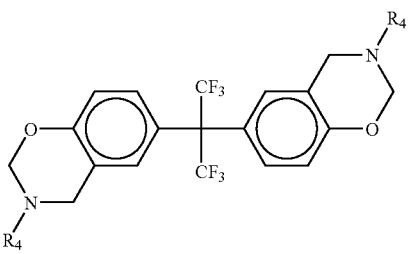

[Formula 15]

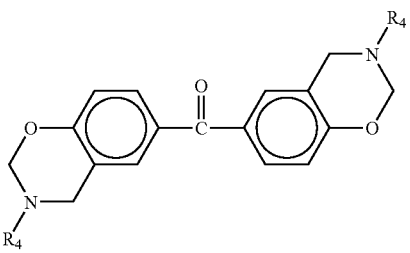

[Formula 16]

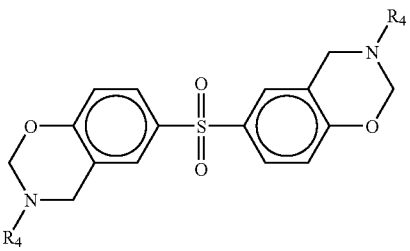

[Formula 17]

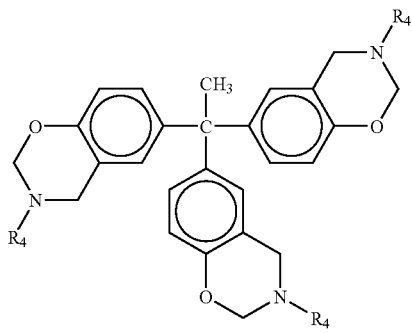

where R4 is a phenyl group, —CH2—CH=CH2, or a group represented by one of the Formulae illustrated below.

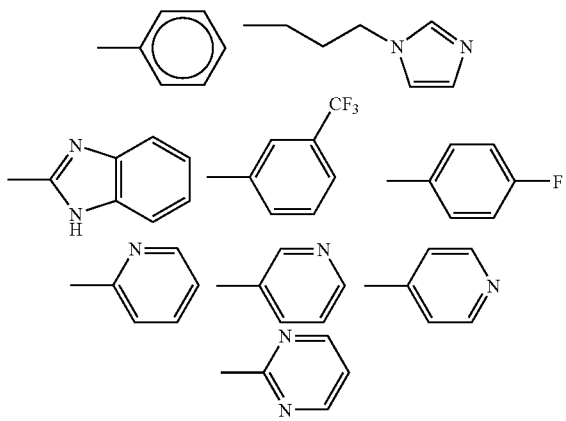

The cross-linkable compound used in an embodiment of the present invention can be any compound that cross-links with a benzoxazine monomer.

Examples of the cross-linkable compound may be, but are not limited to, at least one compound selected from the group consisting of polybenzimidazole (PBI), polybenzothiazole, and polybenzoxazole.

Referring to FIG. 1, a process of synthesizing a cross-linked reaction product of the benzoxazine monomer and the cross-linkable compound is as follows.

The benzoxazine monomer and the cross-linkable compound in Formula 1 are mixed at a predetermined ratio. The amount of the cross-linkable compound may be 10 to 90 parts by weight, for example, 30 to 60 parts by weight, based on 100 parts by weight of the benzoxazine monomer. When the amount of the cross-linkable compound is less than 10 parts by weight, a phosphoric acid cannot be impregnated into the cross-linkable compound, resulting in low proton conductivity, and when the amount of the cross-linkable compound is greater than 90 parts by weight, a cross-linked reaction product melts in the polyphosphoric acid in the presence of excessive phosphoric acid, resulting in gas penetration.

Then, when thermal curing is performed on the above mixture, a cross-linked reaction product can be obtained by an intercrosslinking reaction of a polybenzoxazine formed by polymerization of the benzoxazine monomer and the cross-linkable compound.

Figure 2:
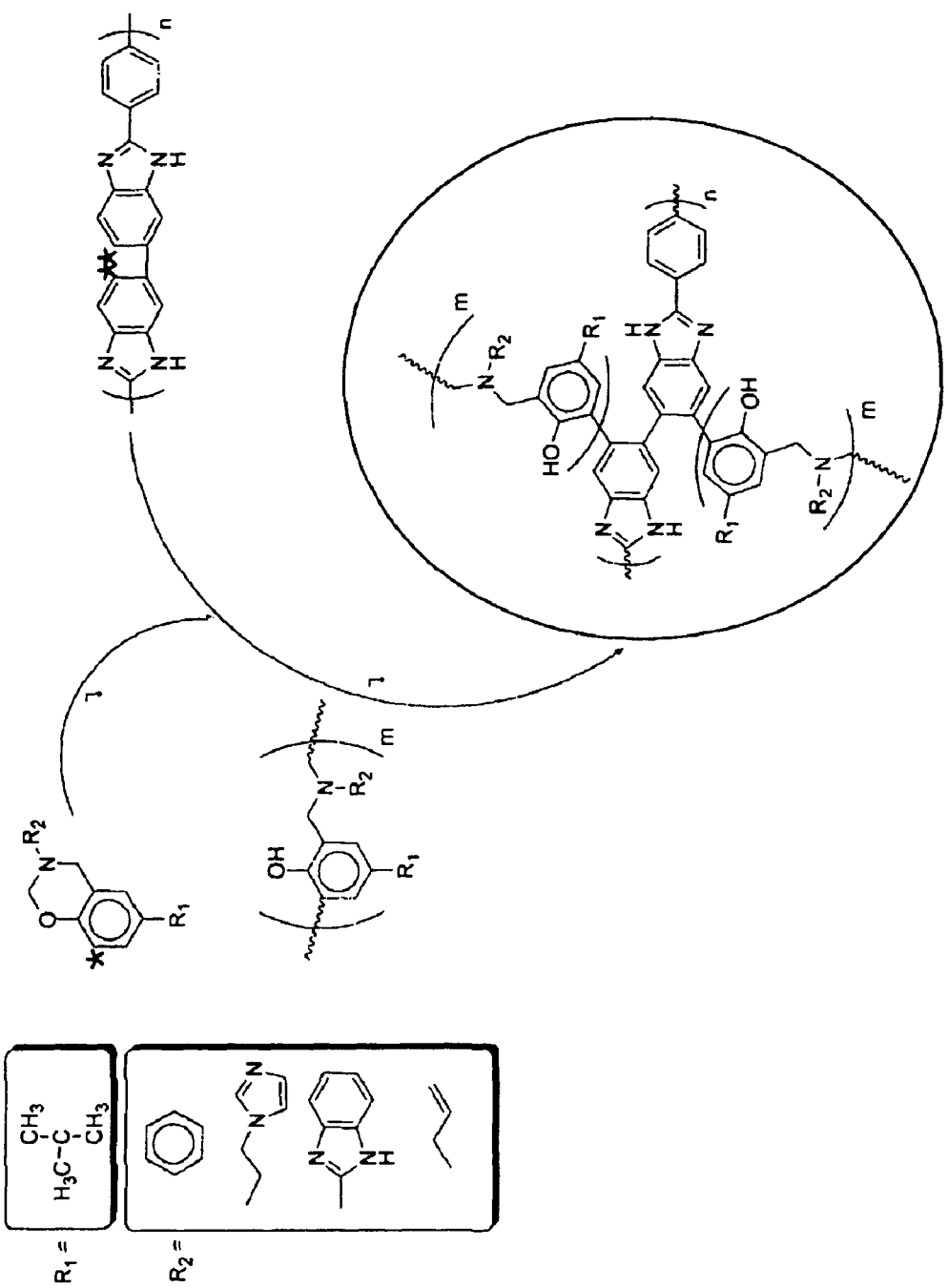
FIGS. 2 and 4 are diagrams illustrating a reaction mechanism between benzoxazine monomer and polybenzimidazole according to an embodiment of the present invention.
Figure 3:
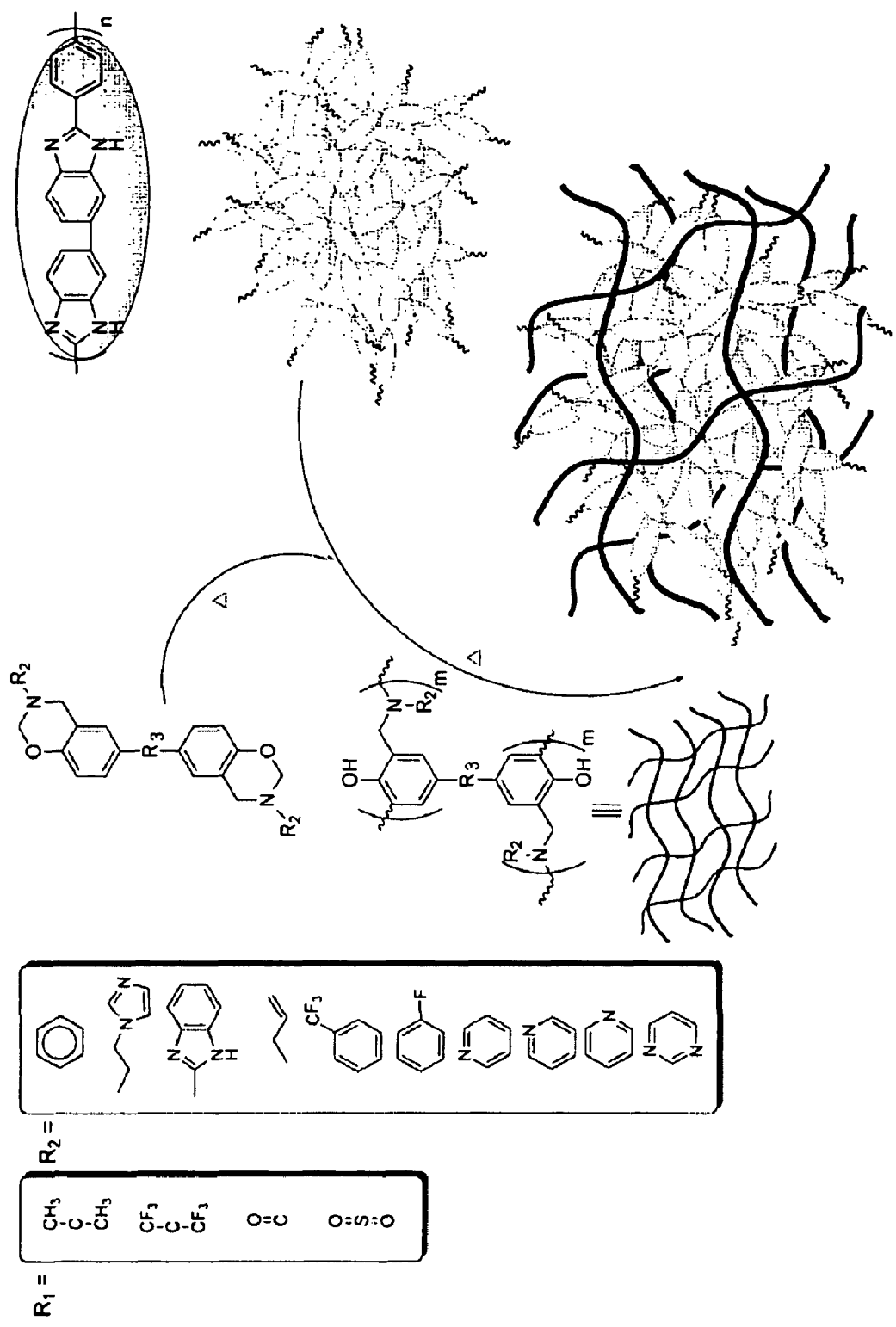
Figure 4:
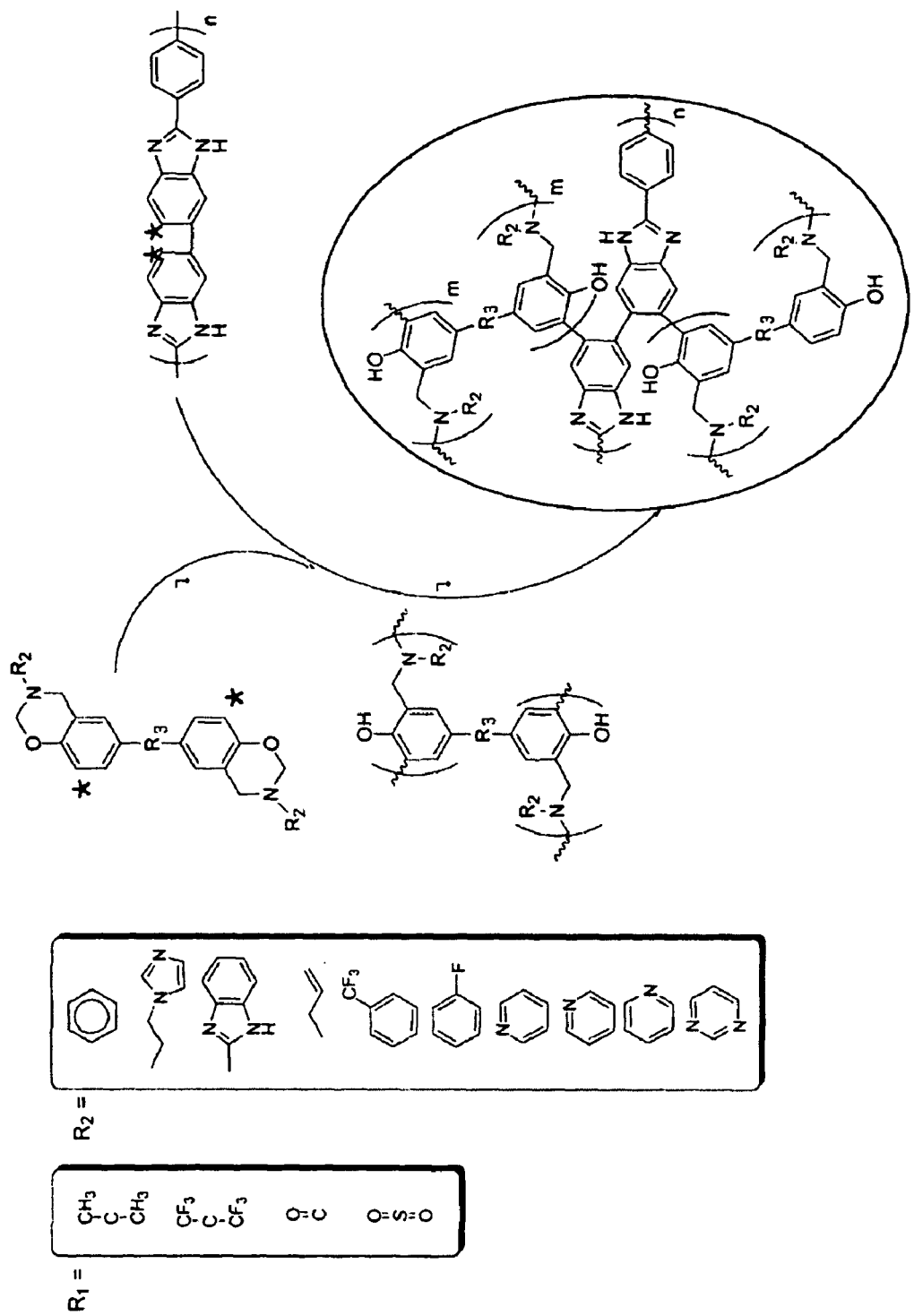

FIG. 2 is a diagram illustrating a reaction mechanism between the benzoxazine monomer and polybenzimidazole according to an embodiment of the present invention.

Referring to FIG. 2, an oxazine ring of the benzoxazine monomer in Formula 2 is opened due to heat, and then the resultant structure binds to an ortho position of a phenyl ring of polybenzimidazole. Then, an intercrosslinking reaction causes growth in a growth direction, as illustrated in FIG. 2.

The temperature of the thermal curing can vary according to the kinds of benzoxazine monomer and cross-linkable compound used, and may be in a range of 80 to 250° C. When the temperature of the thermal curing is below 80° C., the thermal curing reaction cannot progress, and when the temperature of the thermal curing is above 250° C., side-products are produced.

The amount of time that the thermal curing is performed is dependent on the temperature, and may be more than 6 hours, for example, 8 to 20 hours, in the above-mentioned temperature range.

The chemical and physical properties of a cross-linked reaction product of the benzoxazine monomer and the cross-linkable compound are as follows.

In an embodiment of the present invention, the cross-linked reaction product does not dissolve in an organic solvent, an acid, and a base. Accordingly, molecular-weight determination is not possible by gel permeation chromatography (GPC), a conventional method generally used to obtain information on the molecular weight of a polymer.

The result of polymerization of the benzoxazine monomer and the cross-linkable compound can be used as an electrolyte membrane of a fuel cell, and a method of manufacturing such an electrolyte membrane is described above.

The electrolyte membrane according to an embodiment of the present invention includes the cross-linked reaction product of the benzoxazine monomer and the cross-linkable compound. The amount of phosphoric acid impregnated in the electrolyte membrane is 300 to 600 parts by weight based on 100 parts by weight of the electrolyte membrane, the yield strain is 0.5% or less, and the yield stress is 0.3 Mpa or less. When the amount of phosphoric acid impregnated in the electrolyte membrane is less than 300 parts by weight, insufficient phosphoric acid is impregnated, and thus proton conductivity is low. When the amount of phosphoric acid impregnated in the electrolyte membrane is greater than 600 parts by weight, mechanical strength of the resultant electrolyte membrane is low.

The yield strain of the electrolyte membrane may be 0.5% or less, for example, 0.1 to 0.3%, and the yield stress of the electrolyte membrane may be 0.3 MP or less, for example, 0.1 to 0.2 MPa.

When the yield strain is above 0.5%, permanent deformation of the electrolyte membrane may occur. When the yield stress is above 0.1 Mpa, deformation of the electrolyte membrane may also occur, even with the significantly low power.

Herein, "yield strain" refers to the strain needed to cause irreversible plastic deformation to a sample, and "yield stress" refers to the stress needed to cause irreversible plastic deformation to a sample.

In general, the measured value of the yield strain and stress is based on the standard of the American Society for Testing and Materials (ASTM). The membrane was cut using a dog-bone shaped die. The maximum length of the dog-bone was 6.35 cm and the shortest width was 3 mm. The testing was carried out at a rate of at 20 mm/min and was repeatedly performed using 4 samples.

The electrolyte membrane can be used as a hydrogen ion conducting membrane of a fuel cell. A method of manufacturing a membrane and electrode assembly (MEA) using such a hydrogen ion conducting membrane is as follows. The term "MEA" used herein refers to a structure in which a catalyst layer and an electrode are sequentially laminated on both sides of an electrolyte membrane.

In the MEA according to an aspect the present invention, an electrode having a catalyst layer is disposed on each side of the electrolyte membrane according to an embodiment of the present invention. Then, the MEA can be formed by binding the electrodes to the electrolyte membrane at a high temperature and high pressure, or by coating a metal catalyst, which causes an electrochemical catalyst reaction on the electrolyte membrane, and binding a gas diffusion layer to the metal catalyst.

Here, the temperature for the binding may be sufficient to soften the hydrogen ion conducting membrane (approximately 125° C. in the case of NAFION (DuPont)), and the pressure may be 0.1 to 3 ton/cm$^2$, for example, 1ton/cm$^2$.

To manufacture a fuel cell, a bipolar plate is attached to the MEA. The bipolar plate has grooves for supplying fuel, and functions as a collector.

When preparing the MEA, the metal catalyst can be a platinum or a metal-platinum alloy including platinum and at least one metal selected from the group consisting of gold, palladium, rhodium, iridium, ruthenium, tin, molybdenum, and a mixture thereof.

The fuel cell according to aspects the present invention is not particularly restricted, and may be a polymer electrolyte membrane (PEM) fuel cell.

The synthesis process of the benzoxazine monomer of Formula 1 is as follows.

[Reaction Scheme 1]

OH
+ CH$_2$O + NH$_2$R$_2$ →(Δ or Reflux)
(B)
R$_1$
(A)

where R$_1$ and R$_2$ are as defined in Formula 1.

In Reaction Scheme 1, as a specific, non-limiting example, R$_1$ is a tertiary butyl group and R$_2$ is a phenyl group, —CH$_2$-CH=CH$_2$, or a group represented by one of the Formulae illustrated below.

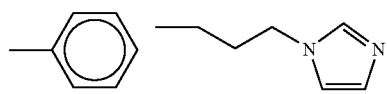

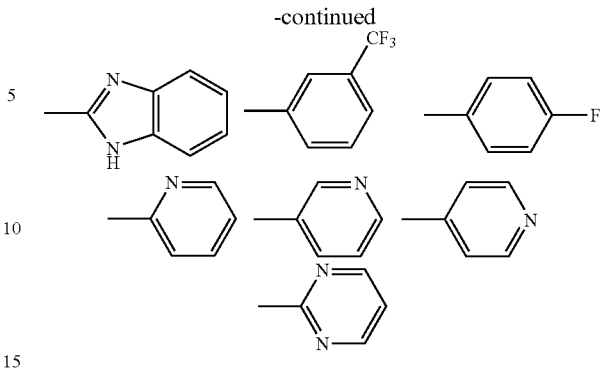

The synthesis of the di-functional or tri-functional polybenzoxazine monomer of Formula 2 will now be described.

[Reaction Scheme 2]

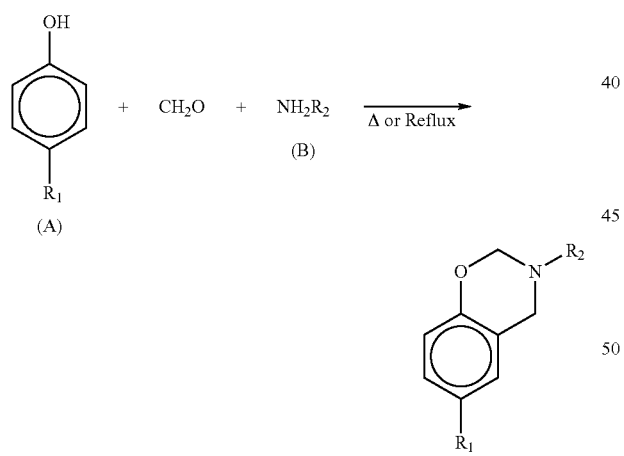

where R$_3$ and R$_4$ are the same as in Formula 2 defined above.
As specific, non-limiting examples, R$_3$ may be —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)— or

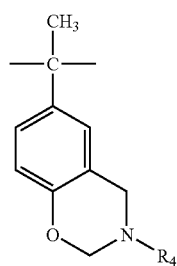

$R_4$ may be a phenyl group, —$CH_2$—$CH$=$CH_2$, or a group represented by one of the Formulae illustrated below.

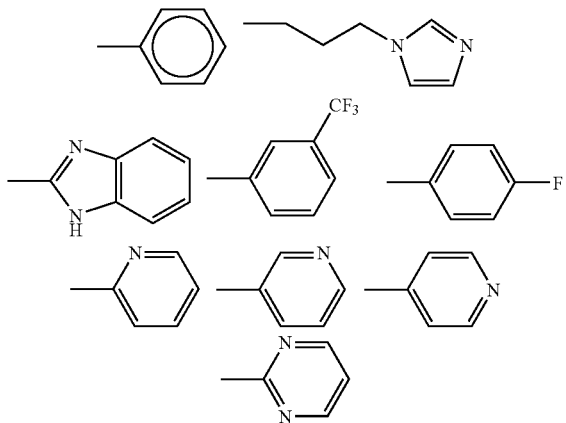

Referring to Reaction Schemes 1 and 2, a phenolic compound (A) or (A'), p-formaldehyde, and an amine derivative (B) or (B') are mixed. Then, the resultant mixture is heated without a solvent or reduced by adding a solvent, and a work-up process is performed to obtain the desired benzoxazine monomer represented by Formula 1 or Formula 2.

The solvent used in Reaction Scheme 1 or 2 may be 1,4-dioxane, chloroform, dichloromethane, or THF. The heating temperature is adjusted to reduce the solvent, and may be 50 to 90° C., for example, 80° C.

Examples of the amine derivative (B) and (B') include compounds in which $R_2$ and $R_4$, respectively, are a phenyl group, —$CH_2$—$CH$=$CH_2$— or a compound represented by one of the Formulae illustrated below.

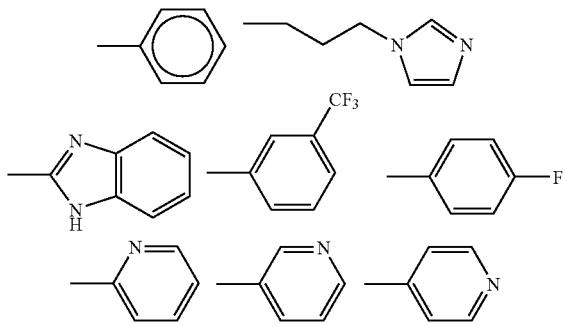

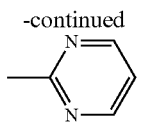

Substituents used in Formula 1 and Formula 2 can be as follows.

Examples of the unsubstituted C1-20 alkyl group in Formula 1 and Formula 2 include methyl, ethyl, propyl, isobutyl, sec-butyl, pentyl, iso-amyl, hexyl, etc. At least one hydrogen atom of the alkyl group can be substituted by a halogen atom, a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The aryl group that may be used in Formula 1 or Formula 2 is used alone or in a combination, and may be a $C_{6-20}$ carbocyclic aromatic system including one or more rings. The rings may be attached or fused together by a pendent method. The term "aryl" includes aromatic radicals such as phenyl, naphthyl and tetrahydronaphthyl. The aryl group can have substituents such as haloalkylene, nitro, cyano, alkoxy, and lower alkylamino. Also, as with the alkyl group, at least one hydrogen atom of the aryl group can be substituted.

The arylalkyl group that may be used in Formula 1 or Formula 2 may be an aryl group as described above in which some of the hydrogen atoms are substituted with radicals such as a lower alkyl such as, for example, methyl, ethyl or propyl. For example, the arylalkyl group can be benzyl or phenylethyl. As with the alkyl group, one or more hydrogen atoms of the arylalkyl group can be substituted.

The heteroaryl group that may be used in Formula 1 or Formula 2 may be a C1-20 monovalent monocyclic or bicyclic aromatic bivalent organic compound that has 1, 2 or 3 hetero atoms selected from the group consisting of N, O, P and S. As with the alkyl group, one or more hetero atoms of the heteroaryl group can be substituted.

The heteroarylalkyl group that may be used in Formula 1 or Formula 2 may be a heteroaryl group in which some of the hydrogen atoms of the heteroaryl group are substituted with an alkyl group. As with the alkyl group, one or more hydrogen atoms of the heteroarylalkyl group can be substituted.

The carbocyclicgroup that may be used in Formula 1 or Formula 2 be a C5-10 ring group such as a cyclohexyl group. As with the alkyl group, one or more hydrogen atoms of the carbocyclicgroup can be substituted.

The carbocyclicalkyl group that may be used in Formula 1 or Formula 2 may be a carbocyclic group in which some of the hydrogen atoms are substituted with an alkyl group. As with the alkyl group, one or more hydrogen atoms of the carbocyclicalkyl group can be substituted.

The heterocyclic group that may be used in Formula 1 or Formula 2 may be a C5-10 cyclic group having hetero atoms such as nitrogen, sulphur, and phosphorus. As with the alkyl group, one or more hydrogen atoms of the heterocyclic group can be substituted.

The heterocyclicalkyl group that may be used in Formula 1 or Formula 2 may be a heterocyclic group in which some of the hydrogen atoms are substituted with an alkyl group. As with the alkyl group, one or more hydrogen atoms of the heterocyclicalkyl group can be substituted.

Aspects of the present invention will be described in greater detail with reference to the following examples. The following examples are for illustrative purposes, and are not intended to limit the scope of the invention.

SYNTHESIS EXAMPLE 1

Preparing the benzoxazine monomer of Formula 3

1 mol of phenol, 2.2 mol of p-formaldehyde and 1.1 mol of aniline were mixed, and the mixture was stirred for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 3 (yield=95%).

SYNTHESIS EXAMPLE 2

Preparing the polybenzoxazine monomer of Formula 4

1 mol of tertiarybutylphenol, 2.2 mol of p-formaldehyde and 1.1 mol of aniline were mixed, and the mixture was stirred without a solvent for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 4 (yield=95%).

SYNTHESIS EXAMPLE 3

Preparing the polybenzoxazine monomer of Formula 5

1 mol of tertiarybutylphenol, 2.2 mol of p-formaldehyde, and 1.1 mol of 3-aminopropylimidazole were mixed, and the mixture was stirred in a melted state without a solvent for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 5 (yield=95%).

SYNTHESIS EXAMPLE 4

Preparing the benzoxazine monomer of Formula 13 (wherein $R_4$=aniline)

1 mol of bisphenol A (BP), 4.4 mol of p-formaldehyde, and 2.2 mol of aniline were mixed, and the mixture was stirred for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 13 (wherein $R_4$=aniline).

SYNTHESIS EXAMPLE 5

Preparing the benzoxazine monomer of Formula 14 (wherein $R_4$=aniline)

1 mol of 4,4'-Hexafluoroisopropylidene diphenol (4,4'-HFIDPH), 4.4 mol of p-formaldehyde and 2.2 mol of aniline were mixed, and the mixture was stirred without a solvent for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 14 (yield=95%).

SYNTHESIS EXAMPLE 6

Preparing the benzoxazine monomer of Formula 15 (wherein $R_4$=3-aminopropyl imidazole)

1 mol of 4,4'-dihydroxybenzophenone, 2.2 mol of p-formaldehyde, and 1.1 mol of 3-aminopropyl imidazole were mixed, and the mixture was stirred in a melted state without a solvent for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 15 (yield=80%).

SYNTHESIS EXAMPLE 7

Preparing the benzoxazine monomer of Formula 16 (wherein $R_4$=1-(3-Aminopropyl)imidazole)

1 mol of Bisphenol S (BS), 4.4 mol of p-formaldehyde and 2.2 mol of 1-(3-Aminopropyl)imidazole were mixed, and the mixture was stirred in a melted state without a solvent for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 16 (yield=98%).

SYNTHESIS EXAMPLE 8

Preparing the benzoxazine monomer of Formula 17 (wherein $R_4$=allyl amine)

1 mol of 1,1,1-tris(4-hydroxy phenyl)ethane (THPE), 6.6 mol of p-formaldehyde and 3.3 mol of allyl amine were mixed, and the mixture was stirred in a melted state without a solvent for 1 hour at 110° C. to obtain a crude product.

The crude product was washed with a 1 N NaOH solution 2 times and then with distilled water 1 time, and then was dried using magnesium sulfate. The resultant was filtered to remove a solvent and vacuum dried to acquire the benzoxazine monomer of Formula 17 (yield=98%).

Figure 11:
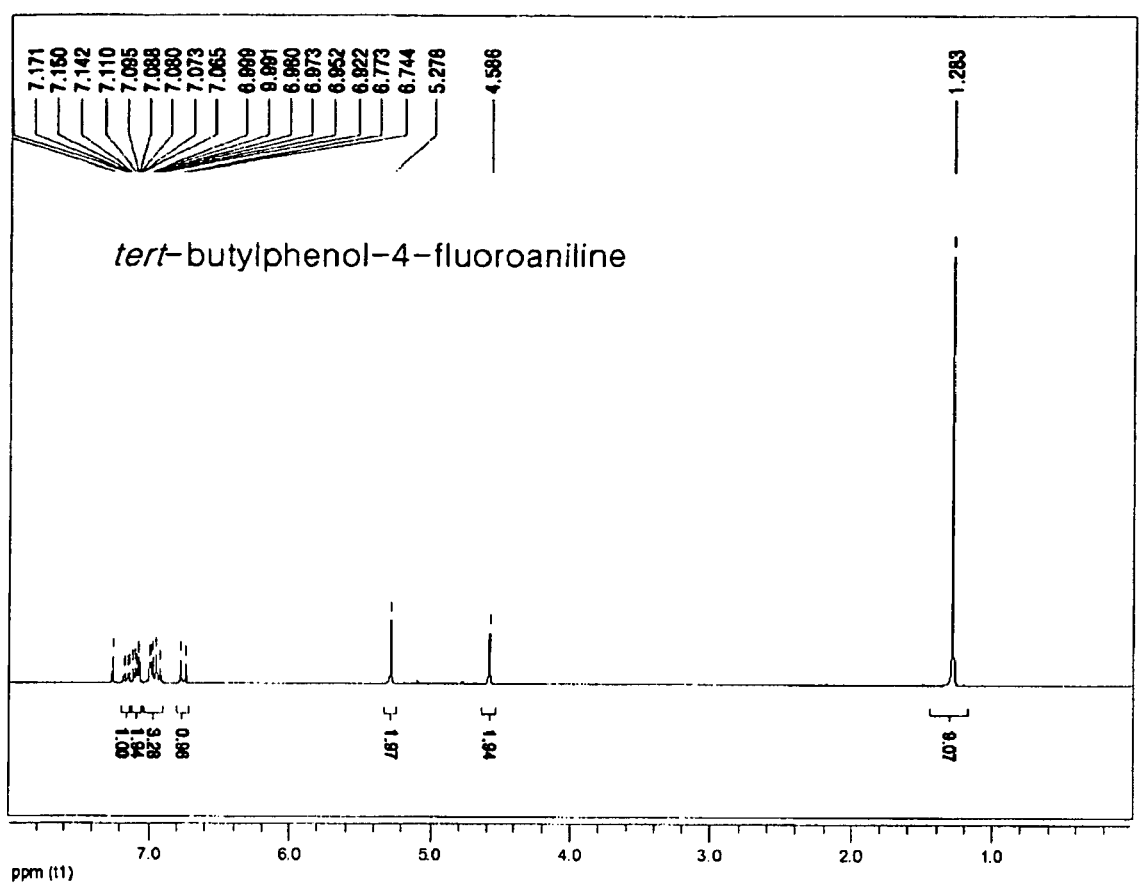
FIGS. 11 through 13 are diagrams showing $^1$H-NMR data of polybenzoxazine monomers according to embodiments of the present invention.
Figure 12:
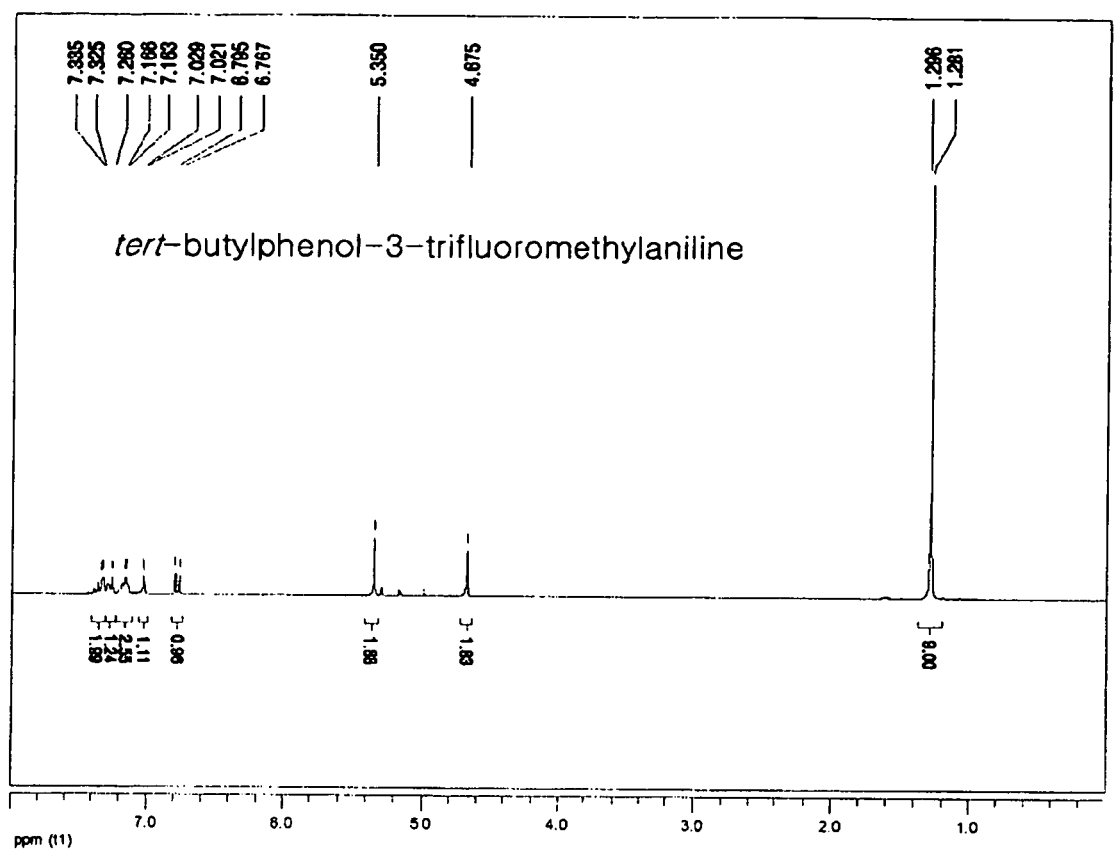
Figure 13:
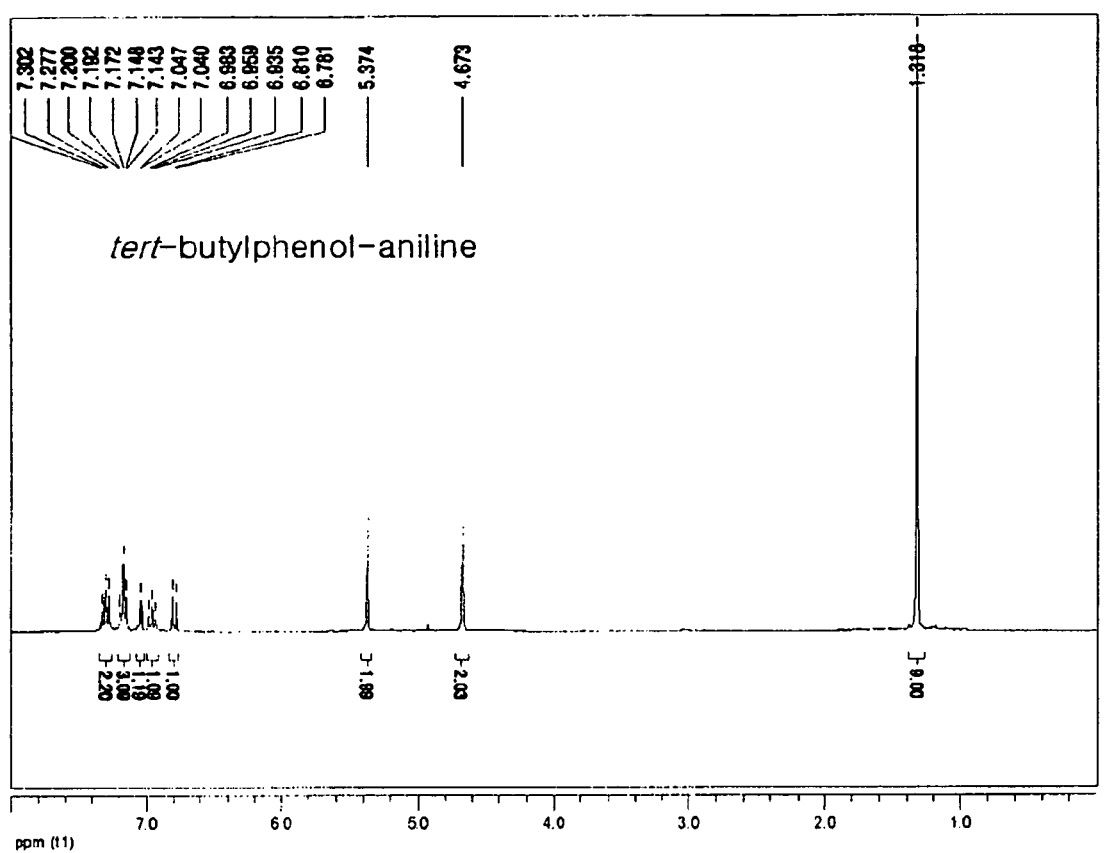

FIGS. 11 through 13 show $^1$H-NMR data of selected polybenzoxazine monomers according to embodiments of the present invention.

EXAMPLE 1

Manufacturing an Electrolyte Membrane and a Fuel Cell Using the Same 100 parts by weight of polybenzimidazole was dissolved in 900 parts by weight of dimethylacetamide to prepare a polybenzimidazole solution.

185 parts by weight of the benzoxazine monomer of Formula 1 obtained according to Synthesis Example 2 was dissolved in the polybenzimidazole solution and was stirred for 4 hours at 80° C. Then, the resultant mixture was filtered to remove impurities.

The mixture was cast onto a polyethyleneterephthalate film to form a membrane and was dried. The dried membrane was exfoliated from the polyethyleneterephthalate film and heated at a rate of 20° C./Hr for 8hours until the temperature reached 230° C. Then, thermal curing was performed at 230° C.

The result obtained through the thermal curing was impregnated with an 85% by weight phosphoric acid solution for about 2 hours and 30 minutes at 80° C. to obtain an electrolyte membrane formed of polybenzimidazole cross-linked with the polybenzoxazine compound. Here, the amount of phosphoric acid used for the impregnating was about 450 parts by weight based on 100 parts by weight of the electrolyte membrane.

In a PBI electrode, a slurry of the catalyst layer was manufactured using PBI and PVDF as binders, and the slurry of the catalyst was coated using a bar coater onto carbon paper in which a microporous layer was coated. The amount of loaded platinum of the manufactured electrode was 1.0-2.0 mg/cm$^2$.

A platinum-cobalt alloy that improves catalyst activation by preventing phosphoric acid anion adsorption was used as a catalyst, and a catalyst ink was manufactured using only polyvinylidenefluoride as a binder. The PBI electrode was manufactured by coating the catalyst ink onto the surface of carbon paper having a microporous layer using a bar coater. The amount of loaded platinum of the manufactured electrode was 2.2-3.5 mg/cm$^2$. An MEA was manufactured using the electrolyte membrane between the electrodes.

For another electrode, an electrode for a phosphoric acid type fuel cell manufactured by E-TEK was used. The loading amount of platinum was 2.0 mg/cm$^2$.

The electrode was used after 110 parts by weight of a phosphoric acid based on 100 parts by weight of the electrode was impregnated into the electrode at 110° C., in a vacuum for 1 hour at 110° C., and then applying an upper pressure for 10 hours.

EXAMPLE 2

Manufacturing an Electrolyte Membrane and a Fuel Cell Using the Same 100 parts by weight of polybenzimidazole was dissolved in 900 parts by weight of dimethylacetamide to prepare a polybenzimidazole solution.

185 parts by weight of the benzoxazine monomer of Formula 1 obtained according to Synthesis Example 2 was dissolved in the polybenzimidazole solution and was stirred for 4 hours at 80° C.

The above mixture was cast onto a glass substrate to a thickness of 250-500 μm using a doctor blade. The result was heated at a rate of 20° C./Hr for 8 hours until the temperature reached 220° C., and then thermal curing was performed at 220° C. to produce a membrane on the glass substrate.

The result was put in distilled water to remove the membrane from the glass substrate, and the membrane was impregnated with an 85% by weight phosphoric acid solution for about 2 hours and 30 minutes at 80° C. to obtain an electrolyte membrane formed of a polybenzimidazole cross-linked with the polybenzoxazine compound. Here, the amount of the phosphoric acid used for impregnating the membrane was about 500 parts by weight based on 100 parts by weight of the electrolyte membrane.

In a PBI electrode, a slurry of the catalyst layer was manufactured using PBI and PVDF as binders and the slurry of the catalyst was coated using a bar coater on carbon paper in which a microporous layer was coated. The amount of loaded platinum of the manufactured electrode was 1.0-2.0 mg/cm$^2$.

A platinum-cobalt alloy that improves catalyst activation by preventing phosphoric acid anion adsorption was used as a catalyst, and a catalyst ink was manufactured using only polyvinylidenefluoride as a binder. The PBI electrode was manufactured by coating the catalyst ink on the surface of carbon paper with a microporous layer using a bar coater. The amount of loaded platinum of the manufactured electrode was 2.2-3.5 mg/cm$^2$. An MEA was manufactured using the electrolyte membrane between the electrodes.

For another electrode, an electrode for a phosphoric acid type fuel cell manufactured by E-TEK was used. The loading amount of platinum was 2.0 mg/cm$^2$.

The electrode was used after 110 parts by weight of a phosphoric acid based on 100 parts by weight of the electrode was impregnated into the electrode at 110° C., in a vacuum for 1 hour at 110° C., and then applying an upper pressure for 10 hours.

COMPARATIVE EXAMPLE 1

A PBI membrane was manufactured using CELAZOLE PBI (Celanese Corp.) and was impregnated with an 85% by weight phosphoric acid solution for 4 hours at room temperature to obtain PBI Membrane.

The PBI membrane impregnated with phosphoric acid was placed between two PBI electrodes prepared in the same manner as in Example 1, and an MEA was manufactured.

COMPARATIVE EXAMPLE 2

A PBI membrane was manufactured using CELAZOLE PBI (Celanese Corp.) and was impregnated with an 85% by weight phosphoric acid solution for 4 hours at room temperature to obtain PBI Membrane.

The PBI membrane impregnated with phosphoric acid was placed between two E-TEK electrodes prepared in the same manner as in Example 1, and an MEA was manufactured.

The high-temperature stability of the electrolyte membrane obtained according to the Comparative Example 1 using Celazole PBI was measured using a thermogravimetric analyzer, which evaluates weight variations with respect to time at a high temperature through Differential Scanning Calorimetry (DSC) analysis. The results are shown in FIG. 7.

Figure 7:
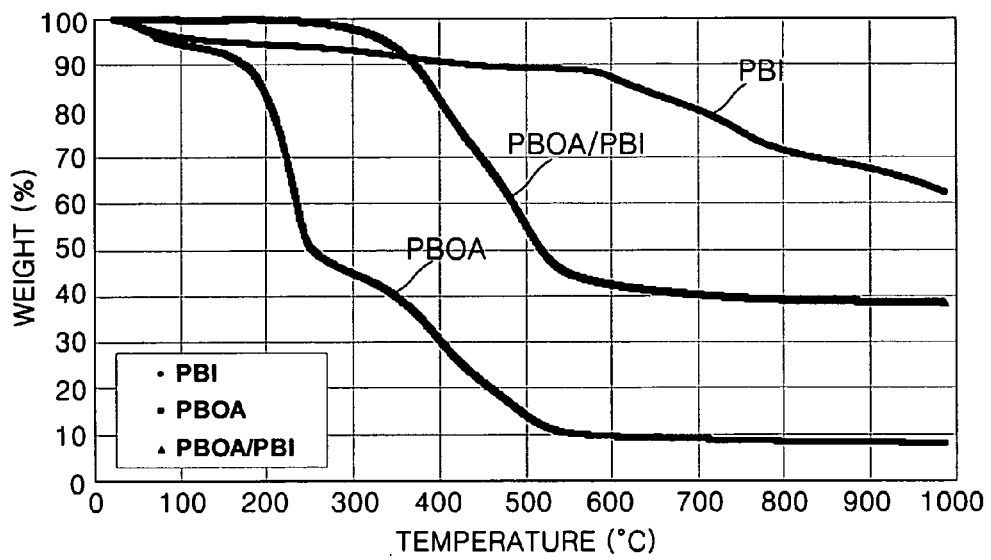
FIG. 7 is a graph illustrating the result of thermogravimetric analysis of an electrolyte membrane to establish an optimized temperature range for thermal curing.

Referring to FIG. 7, for complete thermal curing, the temperature is important, and the optimized temperature for a polybenzoxazine compound is 80-230° C.

The yield strain and yield stress were investigated for the electrolyte membranes manufactured according to Example 1 and Comparative Example 1, and the results are shown in Table 1. The values of the yield strain and yield stress were measured based on the standard of American Society for Testing and Materials (ASTM). The membrane was cut using a dog-bone shaped die. The maximum length of the dog-bone was 6.35 cm and the shortest width was 3 mm. The evaluation was carried out at a rate of 20 mm/min, and was repeatedly performed using 4 samples.

TABLE 1

|  | Yield strain (%) | Yield stress (Mpa) |
| --- | --- | --- |
| Comparative Example 1 | 9.0 | 0.83 |
| Example 1 | 0.20 | 0.10 |

Referring to Table 1, permanent deformation of the electrolyte membrane of Comparative Example 1 occurred easily compared to the electrolyte membrane of Example 1, even with the significantly low power. In particular, in Example 1, there was no yield point. That is, deformation occurred easily, but when the power was removed, the electrolyte membrane of Example 1 was restored, indicating a similar characteristic to a rubber.

The performance of the fuel cells manufactured according to the Examples 1-2 and Comparative Examples 1-2 was evaluated upon initial use of the fuel cells, and then measured again after aging 16 hours with a current density of 0.2 A/cm$^2$. Here, the performance was evaluated by investigating the voltage variation versus current density and the resistance variation in the current-voltage characteristic investigation was evaluated by measuring alternating-current resistance at 1 kHz. The evaluation of the fuel cells was performed with applying hydrogen fuel and air at a battery temperature of 150° C. When the PBI electrode was used and a PtCo catalyst was employed in an air electrode as in Examples 1 and 2, the evaluation was performed by fixing the hydrogen flow rate at 100 ccm (cm$^3$/min), the oxygen flow rate at 200 ccm, and the air flow rate at 200 ccm. When the electrodes manufactured with E-TEK were used, the hydrogen flow rate and the air flow rate were 100 ccm and 300 ccm, respectively. The evaluation results are shown in FIGS. 8 and 9.

Figure 8:
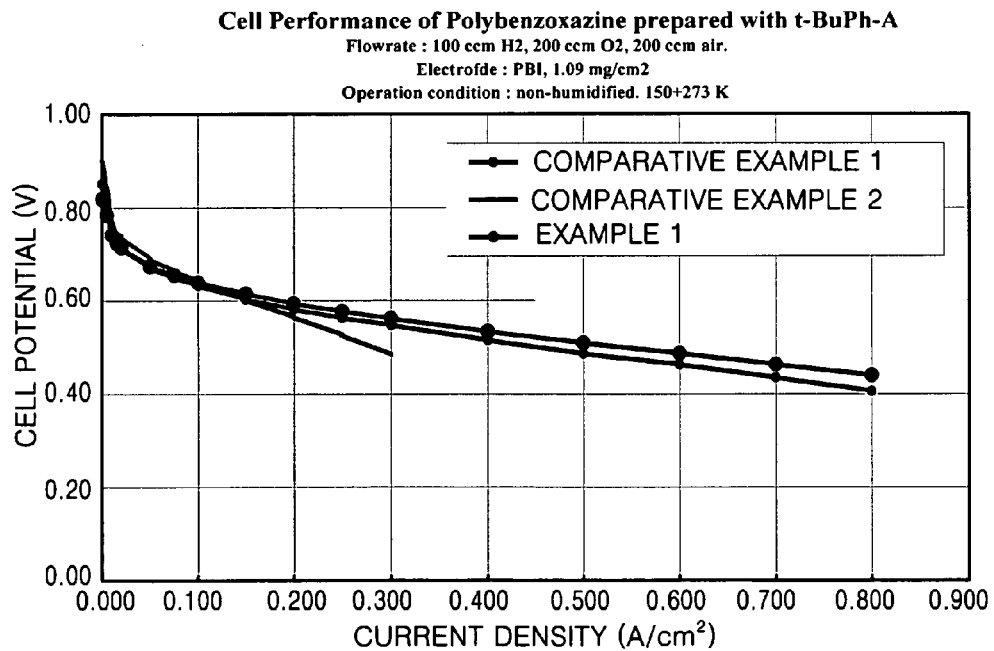
FIGS. 8 through 10 are graphs of voltage versus current density of electrolyte membranes according to embodiments of the present invention.
Figure 9:
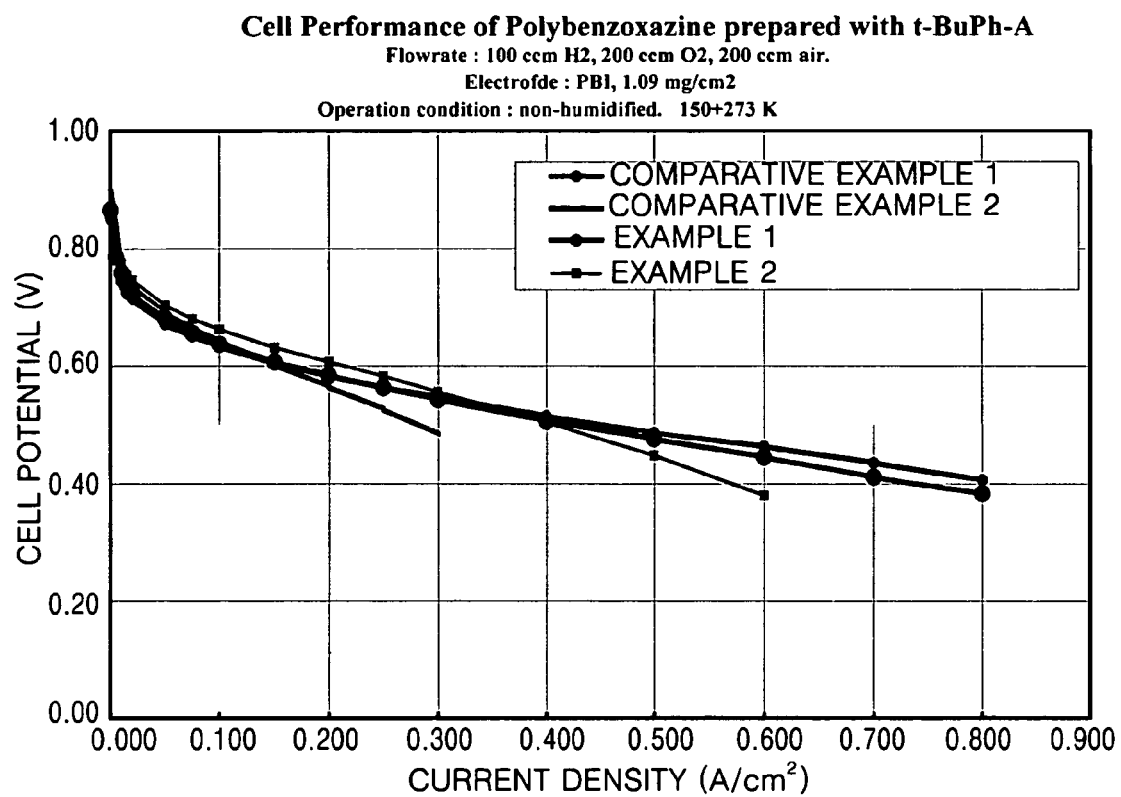

Referring to FIGS. 8 and 9, a polymer electrolyte membrane obtained using tertiary butyl phenol aniline as a benzoxazine compound showed better performance than a PBI-H$_3$PO$_4$ system.

When the E-TEK electrode, in which polyphosphoric acid (105 wt % phosphoric acid) was impregnated, was used, all polymer electrolyte membranes obtained using tertiary butyl phenol aniline as a benzoxazine compound showed better current-voltage performances than a PBI-H$_3$PO$_4$ system.

The decrease in performance of PBI-phosphoric acid MEA occurred because a polyphosphoric acid included in the electrode dissolves PBI, resulting in a gas penetration phenomenon.

When the E-TEK electrode containing the polyphosphoric acid was used, the chemical stability of the electrolyte membrane could be evaluated, and it was determined that the polymer electrolyte membrane formed of the PBI cross-linked the polybenzoxazine compound had excellent chemical stability with respect to polyphosphoric acid.

Figure 10:
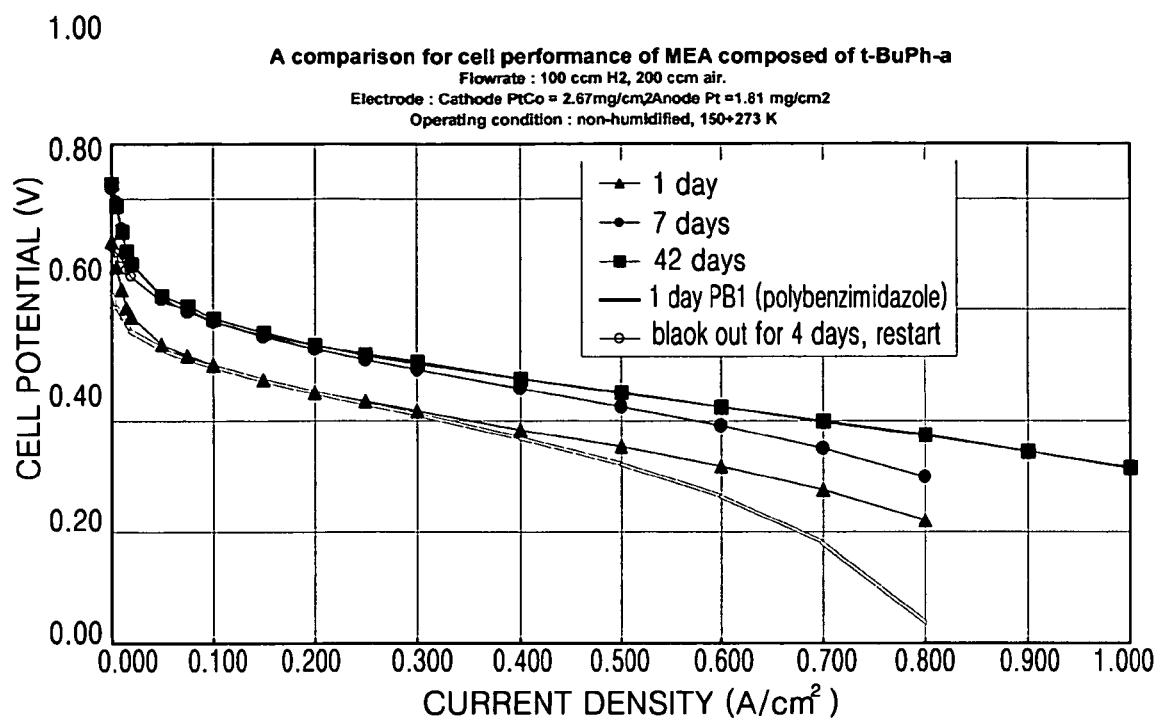

FIG. 10 is a graph of cell performance after various amounts of time for the fuel cell in Example 1.

A polyphosphoric acid included in the electrode, the cause of reduction in PBI-phosphoric acid MEA performance, dissolves PBI and generates the gas penetration phenomenon.

Referring to FIG. 10, the polymer electrolyte membrane formed of PBI cross-linked with the polybenzoxazine compound obtained according to Example 1 provides chemical stability and shows a greater improvement in current-voltage performance than PBI.

According to aspects of the present invention, an electrolyte membrane formed of a cross-linkable compound cross-linked with a polymerized benzoxazine monomer can be manufactured.

The cross-linked material has a strong acid trapping ability relative to the benzoxazine compound and excellent mechanical properties due to a cross-linkage. Also, the solubility of the cross-linked material in polyphosphoric acid is much less than the cross-linkable material by itself, thus, the cross-linked material shows excellent chemical stability. Accordingly, when the cross-linked material is used, an electrolyte membrane having excellent liquid supplementing capability and mechanical and chemical stability at high temperatures can be obtained. The cross-linked material according to aspects of the present invention can be obtained through a simple polymerization process using heat instead of using a polymerization initiator or a cross-linking agent. Also, an additional cross-linking agent is not needed, and thus mass production is possible. Also, the costs of the starting materials used when synthesizing the cross-linked material are reasonable, and thus expenses are reasonable.

The electrolyte membrane formed of the cross-linked material according to aspects of the present invention is useful in a fuel cell operating at high temperatures and low humidity.

Although a few embodiments of the present invention have been shown and described, it would be appreciated by those skilled in the art that changes may be made in this embodiment without departing from the principles and spirit of the invention, the scope of which is defined in the claims and their equivalents

What is claimed is:
1. A method of manufacturing an electrolyte membrane formed of a cross-linked reaction product of a benzoxazine monomer with cross-linkable compound, the method comprising:
dissolving the cross-linkable compound in a solvent to obtain a 10 to 20% by weight cross-linkable compound solution;
mixing the cross-linkable compound solution and the benzoxazine monomer to obtain a mixture of the benzoxazine monomer and the cross-linkable compound;
forming a membrane using the mixture;
heating the membrane to perform thermal curing to a temperature of 80 to 250° C.; and
impregnating the resultant obtained through the thermal curing with an acid to form an electrolyte membrane, wherein the cross-linkable compound comprises at least one compound selected from the group consisting of polybenzimidazole, polybenzthiazole and polybenzoxazole.

2. The method of claim 1, wherein the benzoxazine monomer is represented by one of Formula 1 and Formula 2:

[Formula 1]

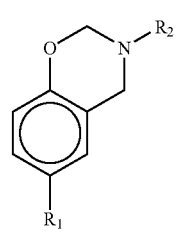

where R₁ is hydrogen, a substituted or unsubstituted C1-C20 alkyl group, a substituted or unsubstituted C6-C20 aryl group, a substituted or unsubstituted C2-C20 heteroaryl group, a substituted or unsubstituted C4-C20 cycloalkyl group, or a substituted or unsubstituted C2-C20 heterocyclic group, and R₂ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic group alkyl group, a substituted or unsubstituted C2-C20 heterocyclic group, or a substituted or unsubstituted C2-C20 heterocyclic alkyl group; and

[Formula 2]

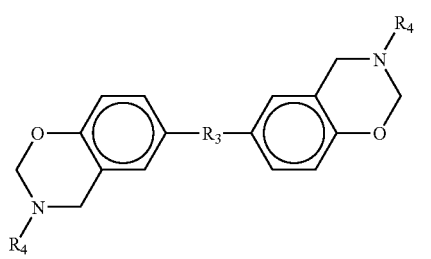

where R₃ is selected from the group consisting of a substituted or unsubstituted C1-C20 alkylene group, a substituted or unsubstituted C6-C20 arylene group, a substituted or unsubstituted C2-C20 heteroarylene group, —C(=O)—, and —SO₂—, and R₄ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclicalkyl group.

3. The method of claim 1, wherein the membrane is formed by tape casting the mixture.

4. The method of claim 1, wherein the membrane is formed by casting the mixture onto a supporter.

5. The method of claim 4, further comprising removing the supporter from resultant obtained through the thermal curing by exfoliating the resultant obtained from the thermal curing from the supporter.

6. The method of claim 5, wherein the supporter is removed by immersing the resultant obtained from the thermal curing in distilled water at a temperature of 60 to 80° C.

7. The method of claim 3, wherein the mixture of the benzoxazine monomer and the cross-linkable compound is filtered before forming the membrane.

8. The method of claim 2, wherein the R₁ in Formula 1 is a tertiarybutyl group.

9. The method of claim 2, wherein the R₂ and R₄ in Formula 1 and Formula 2, respectively, are each independently a phenyl group, —CH₂.CH=CH₂, or a group illustrated in one of the Formulae below:

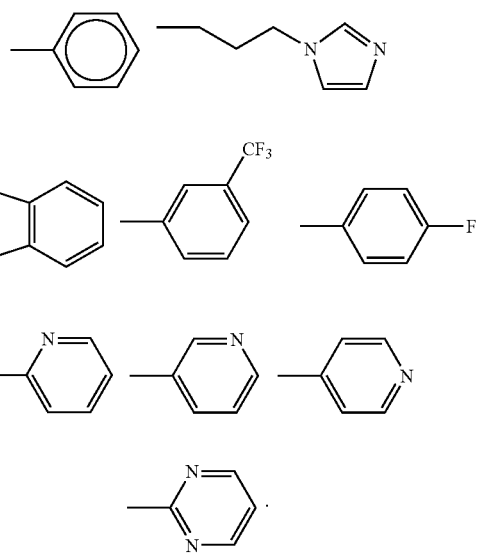

10. The method of claim 2, wherein the R₃ in Formula 2 is at least one of —C(CH₃)₂—, —C(CF₃)₂—, —C(=O)—, —SO₂—, —CH₂—, —C(CCl₃)—, —CH(CH₃)—, —CH(CF₃)— and a group represented by Formula illustrated below:

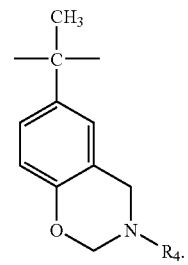

11. The method of claim 2, wherein the compound of Formula 1 is at least one compound selected from the group of compounds represented by Formulas 3 through 12 below:

[Formula 3]

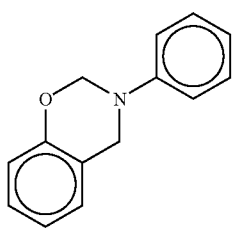

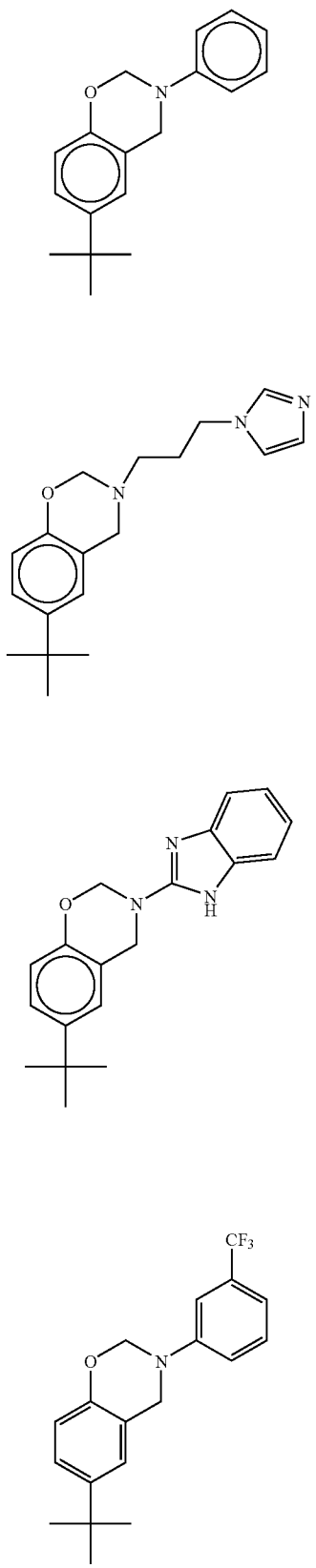

12. The method of claim 1, wherein the compound of Formula 2 is at least one compound selected from the group of compounds represented by Formulas 13 through 17 below:

[Formula 13]

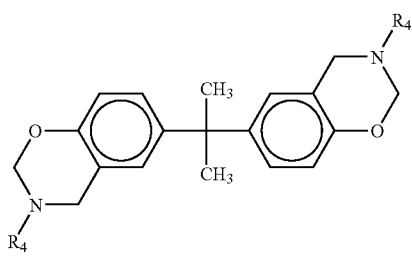

[Formula 14]

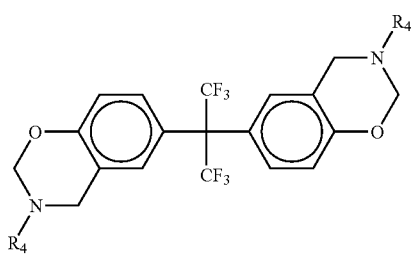

[Formula 15]

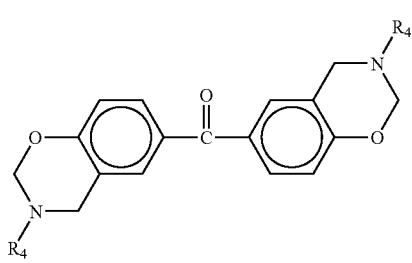

[Formula 16]

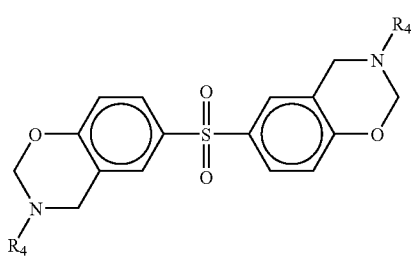

[Formula 17]

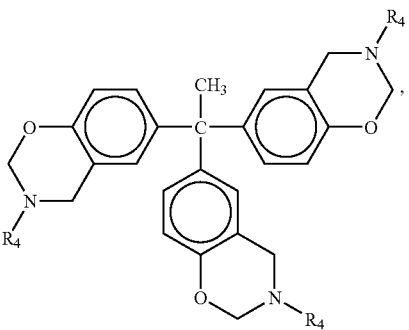

where $R_4$ is one of a phenyl group, $-CH_2\text{-}CH=CH_2-$, and a group represented by one of the Formulas illustrated below:

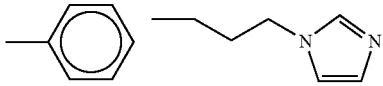
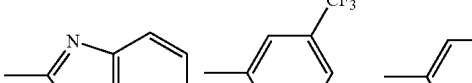
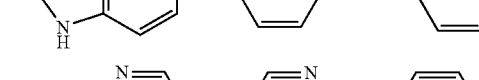
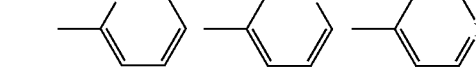
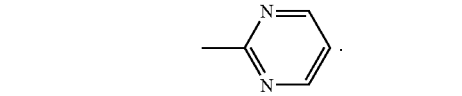

13. The method of claim 1, wherein the amount of the cross-linkable compound is 10 to 90 parts by weight based on 100 parts by weight of the benzoxazine monomer.

14. The method of claim 13, wherein the amount of the cross-linkable compound is 30 to 60 parts by weight based on 100 parts by weight of the benzoxazine monomer.

15. The method of claim 1, wherein the thermal curing is carried out without a polymerization initiator.

16. The method of claim 1, wherein a cross-linking agent other than the benzoxazine monomer or polybenzoxazine formed by polymerizing the benzoxazine monomer is not present during the thermal curing.

* * * * *